US012747185B2

(12) United States Patent
Kim et al.

(10) Patent No.: US 12,747,185 B2
(45) Date of Patent: Sep. 29, 2026

(54) PLASMA-RESISTANT GLASS AND MANUFACTURING METHOD THEREOF

(71) Applicants: IONES CO., LTD., Gyeonggi-do (KR); KOREA INSTITUTE OF CERAMIC ENGINEERING AND TECHNOLOGY, Gyeongsangnam-do (KR)

(72) Inventors: Dae Gean Kim, Gyeonggi-do (KR); Hye Won Seok, Seoul (KR); Mun Ki Lee, Gyeonggi-do (KR); Hyeong Jun Kim, Chungcheongnam-do (KR)

(73) Assignees: IONES CO., LTD., Gyeonggi-do (KR); KOREA INSTITUTE OF CERAMIC ENGINEERING AND TECHNOLOGY, Gyeongsangnam-do (KR)

( * ) Notice: Subject to any disclaimer, the term of this patent is extended or adjusted under 35 U.S.C. 154(b) by 963 days.

(21) Appl. No.: 17/787,888

(22) PCT Filed: Nov. 19, 2020

(86) PCT No.: PCT/KR2020/016374
§ 371 (c)(1),
(2) Date: Jun. 21, 2022

(87) PCT Pub. No.: WO2021/132893
PCT Pub. Date: Jul. 1, 2021

(65) Prior Publication Data

US 2023/0043972 A1 Feb. 9, 2023

(30) Foreign Application Priority Data

Dec. 24, 2019 (KR) ........................ 10-2019-0174042

(51) Int. Cl.
*C03C 3/112* (2006.01)
*C03B 5/16* (2006.01)
(Continued)

(52) U.S. Cl.
CPC ................ *C03C 3/112* (2013.01); *C03B 5/16* (2013.01); *C03B 25/00* (2013.01); *C03C 4/20* (2013.01); *C03C 2204/00* (2013.01)

(58) Field of Classification Search
CPC ....... C03C 3/112; C03C 4/20; C03C 2204/00; C03C 3/062
See application file for complete search history.

(56) References Cited

U.S. PATENT DOCUMENTS 5,338,771 A * 8/1994 Neumann ............. A61L 27/105 501/109
7,661,277 B2 2/2010 Sato et al.

FOREIGN PATENT DOCUMENTS

JP S63176335 A 7/1988
KR 1020120057272 6/2012
(Continued)

OTHER PUBLICATIONS

KR20180080429A machine translation (Year: 2018).*
(Continued)

*Primary Examiner* — Cameron K Miller
(74) *Attorney, Agent, or Firm* — Meunier Carlin & Curfman LLC

(57) ABSTRACT

The present invention relates to plasma-resistant glass containing 32-52 mol % of $SiO_2$, 5-15 mol % of $Al_2O_3$, 30-35 mol % of CaO, and 0.1-15 mol % of $CaF_2$ as chemical components, and a manufacturing method thereof. According to the present invention, a glass stability index $K_H$ is 2.0
(Continued)

G1000 G9505 G9010 G8515 G8020 or higher, and a plasma-resistant characteristic of an etch rate of lower than 10 nm/min for a mixed plasma of fluorine and argon (Ar) is exhibited.

16 Claims, 8 Drawing Sheets

(51) Int. Cl.
*C03B 25/00* (2006.01)
*C03C 4/20* (2006.01)

(56) References Cited

FOREIGN PATENT DOCUMENTS

| | | | | |
|---|---|---|---|---|
| KR | 20180080429 A | * | 7/2018 | ........... B09B 3/0083 |
| KR | 1020180080429 A | | 7/2018 | |

OTHER PUBLICATIONS

Mukherjee, Debasis Pradip, and Sudip Kumar Das. "SiO2—Al2O3—CaO glass-ceramics: effects of CaF2 on crystallization, microstructure and properties." Ceramics international 39.1 (2013): 571-578. (Year: 2013).*

Deubener, J., et al. "Updated definition of glass-ceramics." Journal of Non-Crystalline Solids 501 (2018): 3-10. (Year: 2018).* https://en.wikipedia.org/wiki/Amorphous_solid accessed Jan. 28, 2026 (Year: 2026).*

Fernandez, Hugo et al., Apatite crystallization from glasses in the Ca5(PO4)3F—CaAl2Si2O8—CaMgSi2O6—NaAlSi3O8 system, Journal of Non-Crystalline Solids, available online Jan. 9, 2013, vol. 363, pp. 32-38.

Hafini, A.R. et al., Bioactivity potential of calcium alumino-silicate glasses and glass-ceramics, containing nitrogen and fluorine, Journal of Materials Science, published online Mar. 27, 2014, vol. 49 No. 13, pp. 4590-4594.

English Translation of International Search Report, in connection with international application No. PCT/KR2020/016374, dated Feb. 26, 2021, 3 pages.

Mukherjee, D. P et al. SiO2—Al2O3—CaO glass-ceramics: Effects of CaF2 on crystallization, microstmcture and properties. Ceramics International. 2013 [electronic publication: Jul. 5, 2012], vol. 39, pp. 571-578.

Banuamali, S. et al. Crystallization and sintering characteristics of CaO—Al2O3—SiO2 glasses in the presence of TiO2, CaF2 and ZrO2. Thermochimica Acta. 2009 [electronic publication: Jan. 15, 2009], vol. 488, pp. 60-65.

Hill, R. G. et al. Thermal Analysis of a SiO2—Al2O3—CaO—CaF2 Glass. J. Am. Ceram. Soc. 1992, vol. 75, No. 4, pp. 778-785.

* cited by examiner

[FIG. 1]
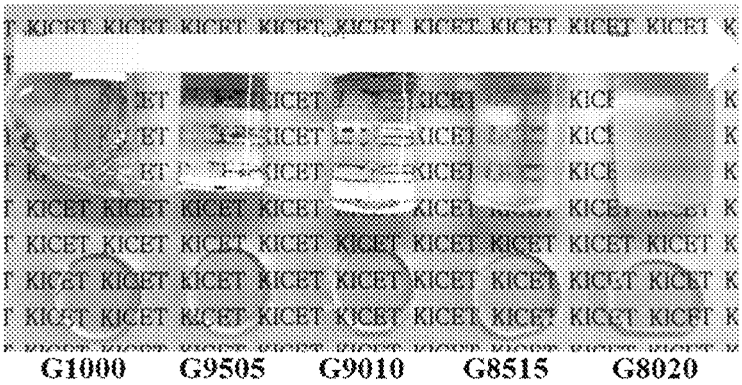
[FIG. 2]
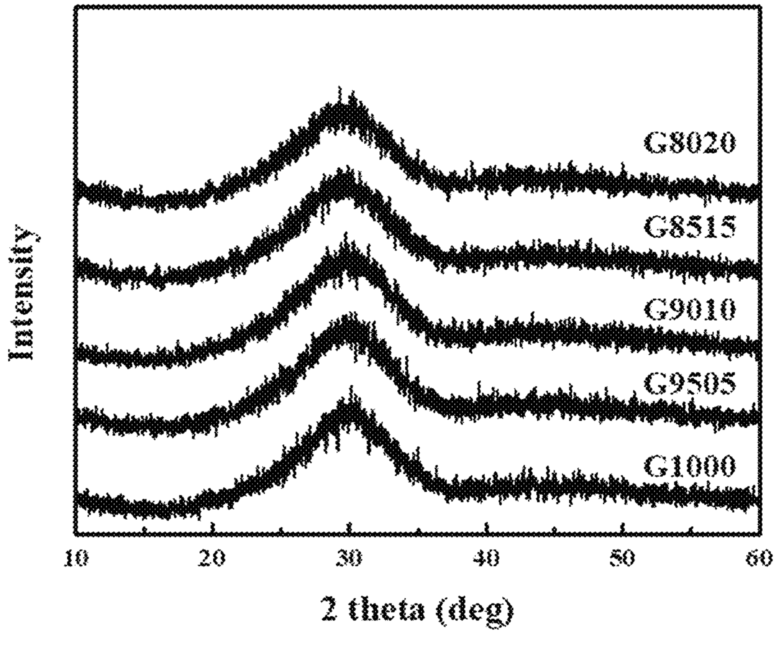

[FIG. 3]
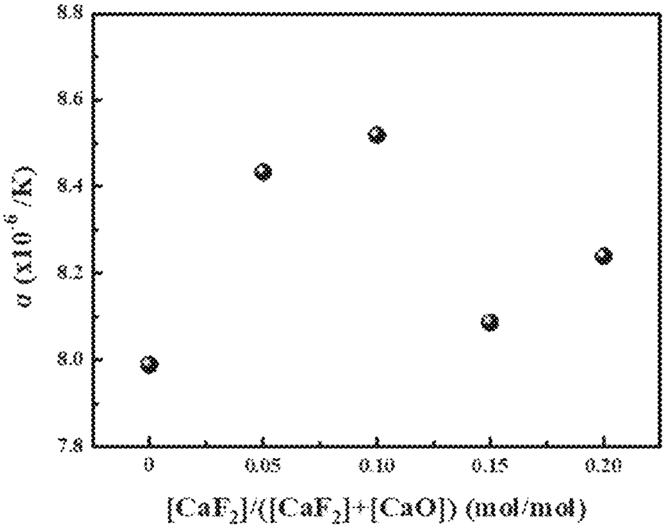
[FIG. 4]
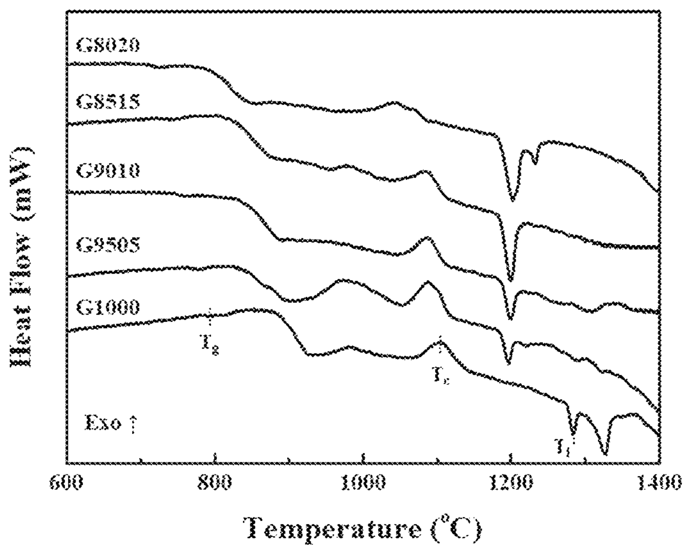

[FIG. 5]
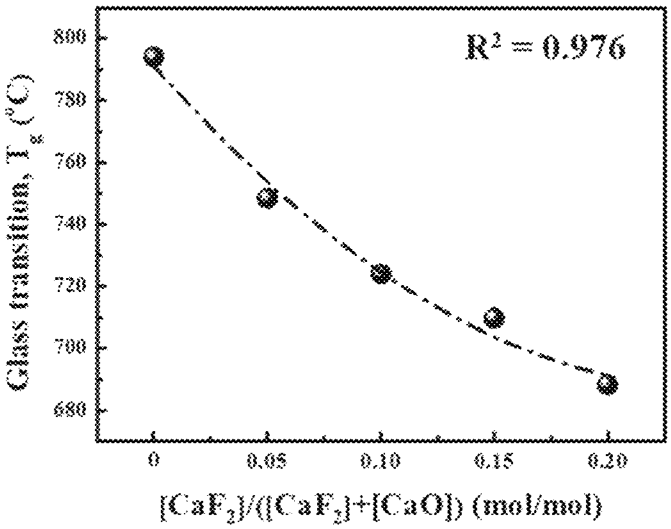
[FIG. 6]
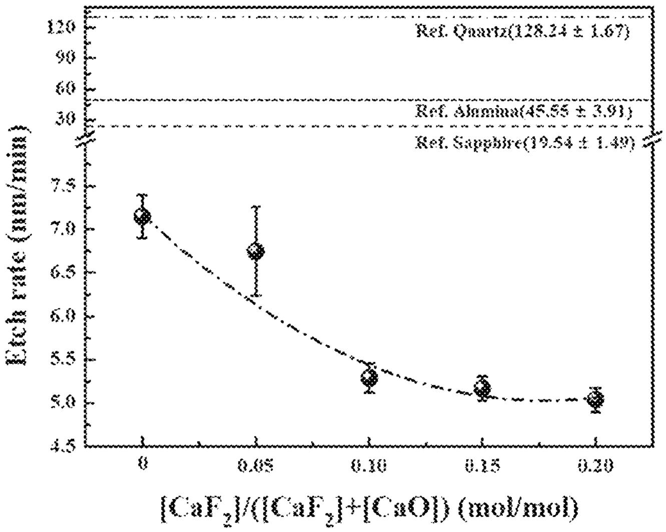

[FIG. 7]
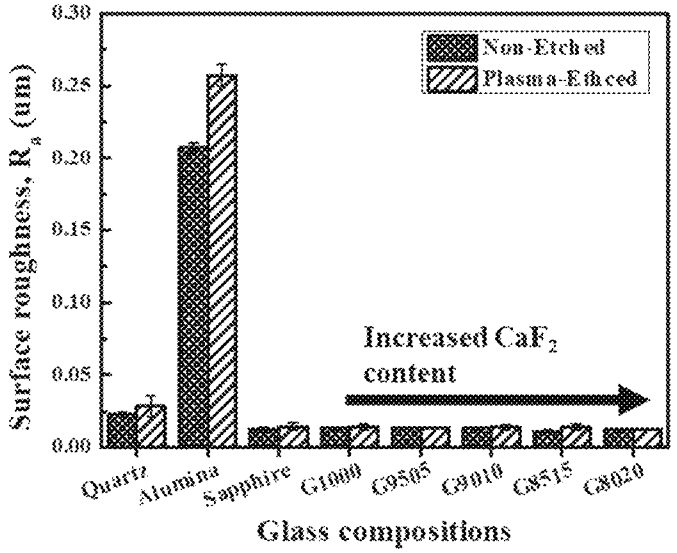
[FIG. 8a]
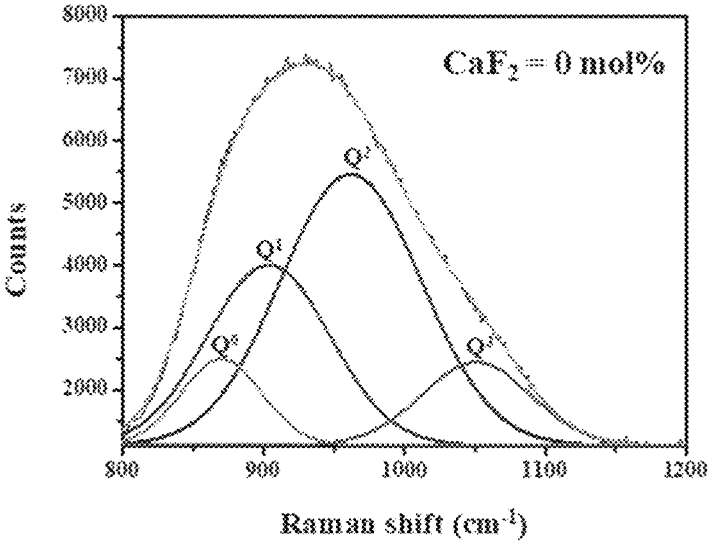

[FIG. 8b]
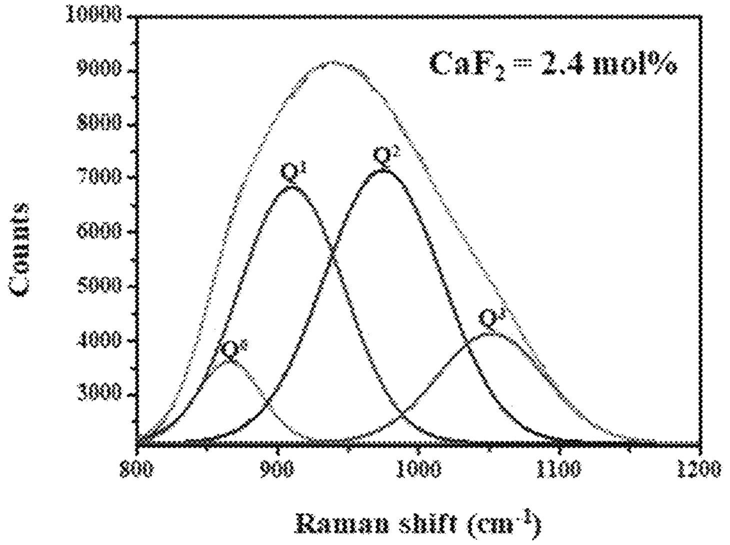
[FIG. 8c]
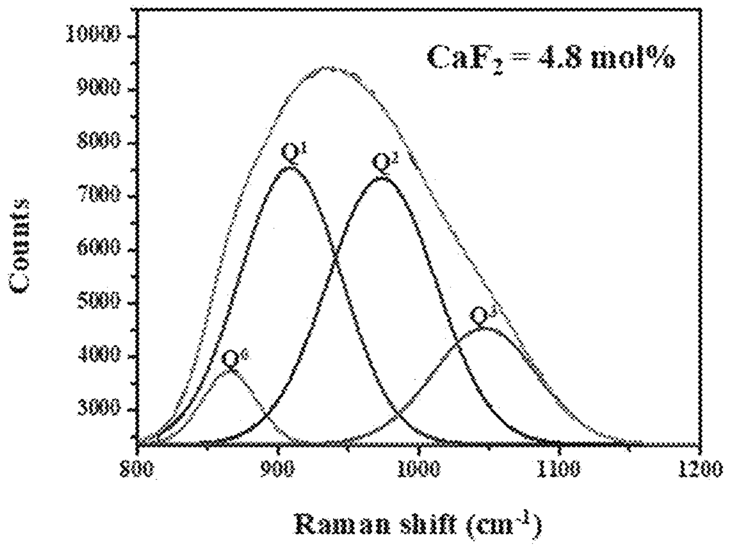

[FIG. 8d]
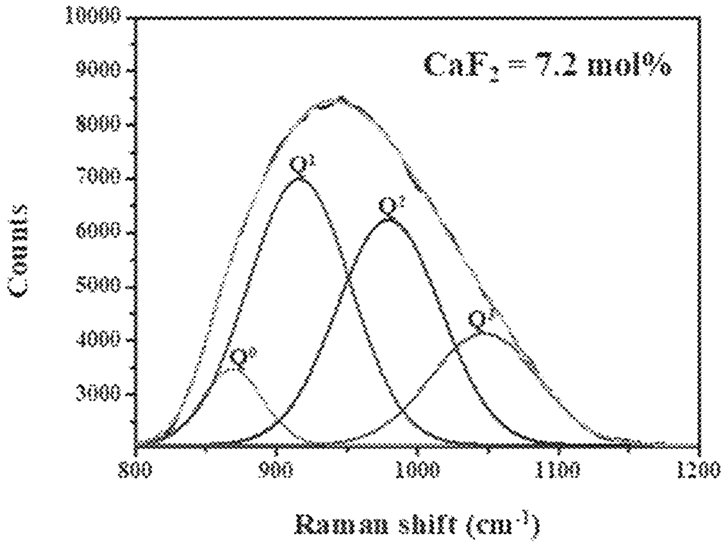
[FIG. 8e]
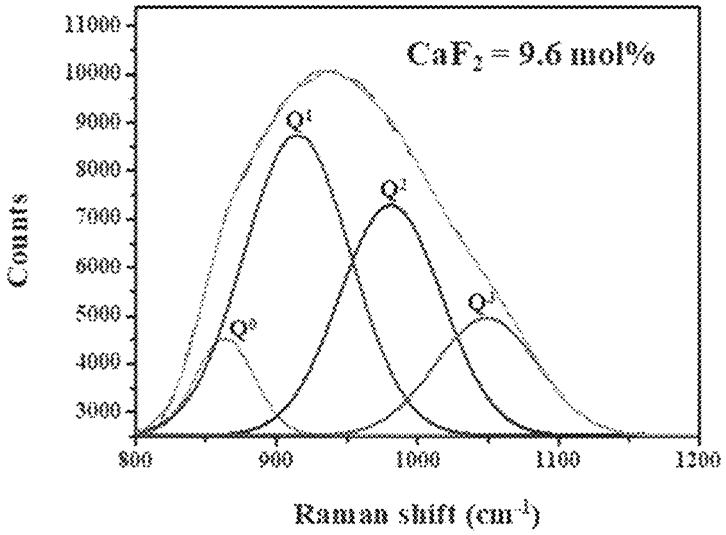

[FIG. 9]
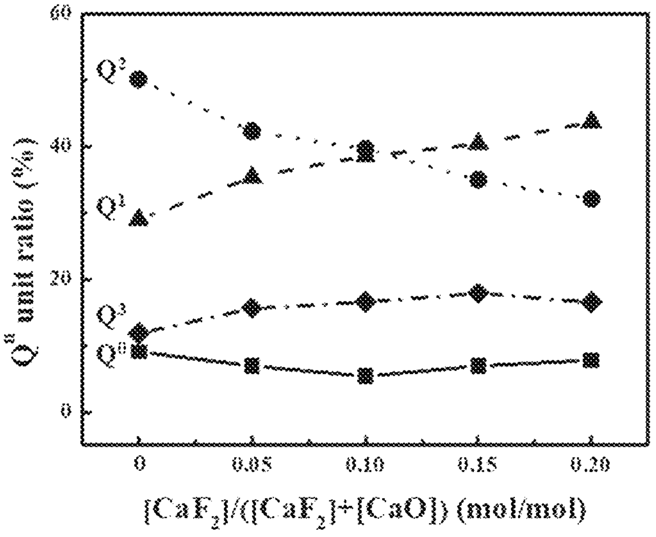

[FIG. 10]
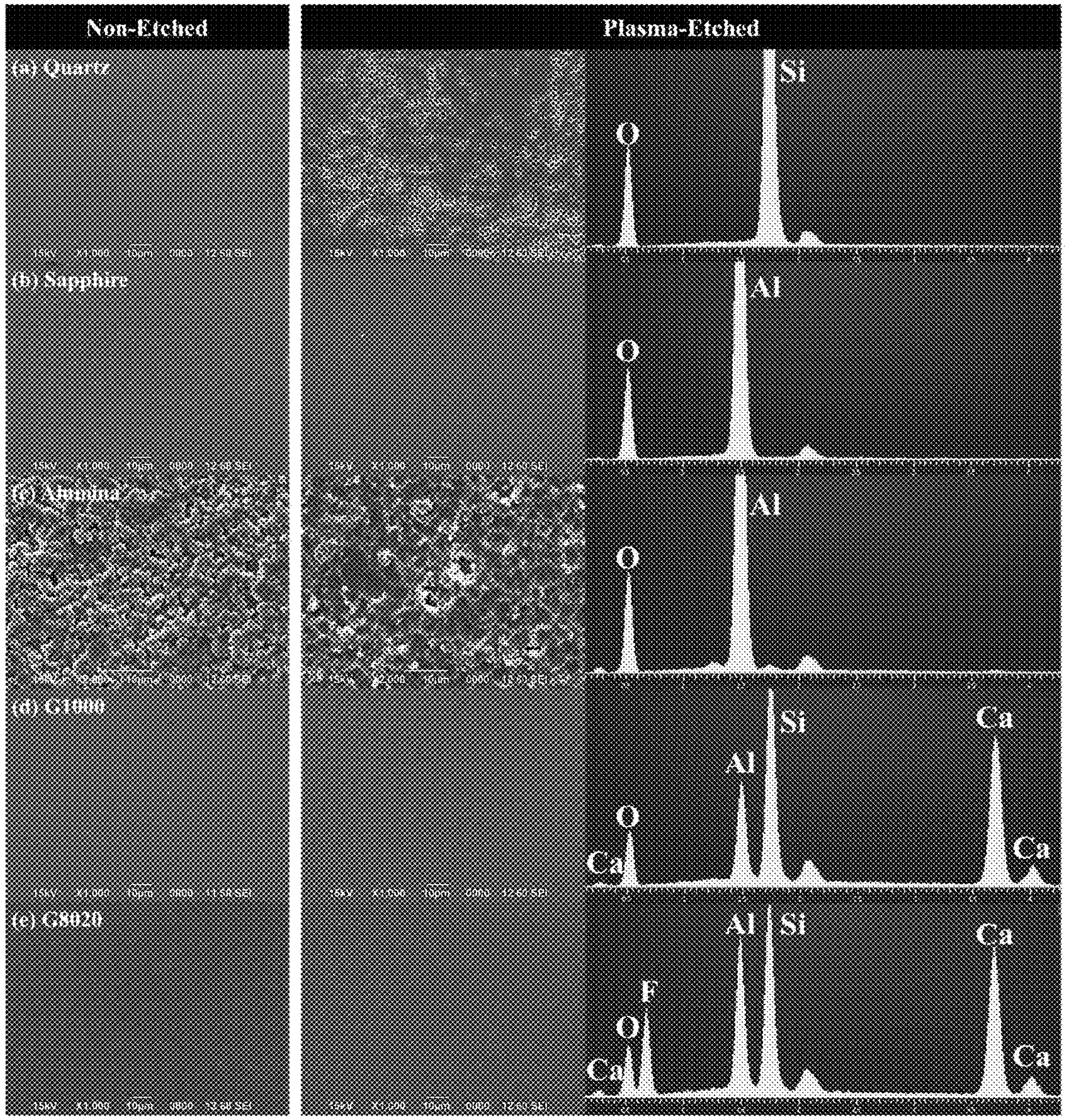

PLASMA-RESISTANT GLASS AND MANUFACTURING METHOD THEREOF

CROSS REFERENCE TO RELATED APPLICATIONS

This application is a United States National Phase Patent Application of International Patent Application Number PCT/KR2020/016374, filed on Nov. 19, 2020, which claims the benefit of priority to KR Application No. 10-2019-0174042, filed Dec. 24, 2019.

TECHNICAL FIELD

The present invention relates to a plasma-resistant glass and a manufacturing method thereof, and more specifically, to a plasma-resistant glass having a high glass stability index $K_H$ of 2.0 or greater and exhibiting plasma resistance properties with an etching rate of 10 nm/min or lower for a mixed plasma of fluorine and argon (Ar).

BACKGROUND ART

When manufacturing various semiconductor devices such as a 3D NAND flash, FinFET, a semiconductor device of less than 10 nm, and the like, a plasma etching process is applied. As nano processes are applied, etching difficulty is increased, and as internal parts of a semiconductor process chamber which are exposed to a high-density plasma environment, oxide-based ceramics such as alumina ($Al_2O_3$) and yttria ($Y_2O_3$) which have corrosion resistance are mainly used.

When a polycrystalline material is exposed for a long period of time to a high-density plasma etching environment in which a fluorine-based gas is used, particles are detached due to local erosion, which may increase the probability of occurrence of contaminant particles. This causes defects in a semiconductor device and adversely affects the yield of semiconductor production.

PRIOR ART DOCUMENT

Patent Document

Korean Patent Registration No. 10-0689889

DISCLOSURE OF THE INVENTION

Technical Problem

An aspect of the present invention provides a plasma-resistant glass having a high glass stability index $K_H$ of 2.0 or greater and exhibiting plasma resistance properties with an etching rate of 10 nm/min or lower for a mixed plasma of fluorine and argon (Ar).

Technical Solution

The present invention provides a plasma-resistant glass including 32 to 52 mol % of $SiO_2$, 5 to 15 mol % of $Al_2O_3$, 30 to 55 mol % of CaO, and 0.1 to 15 mol % of $CaF_2$ as chemical components.

It is preferable that the CaO and the $CaF_2$ have a molar ratio of 2.5:1 to 50:1.

The glass transition temperature ($T_g$) of the plasma-resistant glass may be lower than 750° C.

The crystallization temperature ($T_c$) of the plasma-resistant glass may be lower than 1090° C.

The glass stability index $K_H$ of the plasma-resistant glass may be expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass may exhibit a $K_H$ in the range of 2.0 to 3.5.

The plasma-resistant glass may be a glass used in a mixed plasma environment of fluorine and argon (Ar), and the plasma-resistant glass may have plasma resistance properties with an etching rate of 10 nm/min or lower for a mixed plasma of fluorine and argon (Ar).

The plasma-resistant glass may further include 0.01 to 15 mol % of $Y_2O_3$ as a chemical component.

The plasma-resistant may further include 0.01 to 15 mol % of $ZrO_2$ as a chemical component.

In addition, the present invention provides a method for manufacturing a plasma-resistant glass, the method including preparing a plasma-resistant glass raw material by mixing $SiO_2$ powder, a $Al_2O_3$ precursor, a CaO precursor, and $CaF_2$ powder, melting the plasma-resistant glass raw material in an oxidizing atmosphere, rapidly cooling the melt, heat-treating the rapidly cooled resultant product at a temperature higher than the glass transition temperature, and annealing the heat-treated resultant product to obtain a plasma-resistant glass, wherein the plasma-resistant glass includes 32 to 52 mol % of $SiO_2$, 5 to 15 mol % of $Al_2O_3$, 30 to 55 mol % of CaO, and 0.1 to 15 mol % of $CaF_2$ as chemical components.

It is preferable that the heat-treatment is performed at a temperature higher than the glass transition temperature ($T_g$) of the plasma-resistant glass and lower than the crystallization temperature ($T_c$) of the plasma-resistant glass.

The $Al_2O_3$ precursor may include $Al(OH)_3$ powder, and the CaO precursor may include $CaCO_3$ powder.

The plasma-resistant glass raw material may further include $Y_2O_3$ powder, and the plasma-resistant glass may further include 0.01 to 15 mol % of $Y_2O_3$ as a chemical component.

The plasma-resistant glass raw material may further include $ZrO_2$ powder, and the plasma-resistant glass may further include 0.01 to 15 mol % of $ZrO_2$ as a chemical component.

It is preferable that the CaO and the $CaF_2$ have a molar ratio of 2.5:1 to 50:1.

The glass transition temperature ($T_g$) of the plasma-resistant glass may be lower than 750° C.

The crystallization temperature ($T_c$) of the plasma-resistant glass may be lower than 1090° C.

The glass stability index $K_H$ of the plasma-resistant glass may be expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass may exhibit a $K_H$ in the range of 2.0 to 3.5.

The plasma-resistant glass may be a glass used in a mixed plasma environment of fluorine and argon (Ar), and the plasma-resistant glass may have plasma resistance properties with an etching rate of 10 nm/min or lower for a mixed plasma of fluorine and argon (Ar).

Advantageous Effects

A plasma-resistant glass of the present invention has a high glass stability index $K_H$ of 2.0 or greater and exhibits plasma resistance properties with an etching rate of 10 nm/min or lower for a mixed plasma of fluorine and argon (Ar).

The plasma-resistant glass of the present invention may be used as a material for a device or part used in a semiconductor or display device manufacturing process, and when the plasma-resistant glass is used, sufficient durability may be secured even in a plasma environment, and the generation of particles may be suppressed, and contamination may also be prevented since there are no pores on the surface because it is smooth.

In addition, when the plasma-resistant glass of the present invention is pulverized and made into glass powder, and a paste containing the glass powder is coated on a device or part (e.g., a device or part made of a ceramic material) used in a semiconductor or display device manufacturing process, there is an effect that may prevent outgassing in addition to the above effect.

BRIEF DESCRIPTION OF THE DRAWINGS

FIG. 1 is a photograph showing glasses manufactured according to Experimental Examples.

FIG. 2 is a drawing showing results of X-ray diffraction (XRD) analysis of glasses manufactured according to Experimental Examples.

FIG. 3 is a drawing showing thermal expansion coefficients (α) of glasses manufactured according to Experimental Examples in accordance with a function of the molar ratio of $[CaF_2]/([CaF_2]+[CaO])$.

FIG. 4 is a drawing showing differential thermal analysis (DTA) curves of glasses manufactured according to Experimental Examples in accordance with the content of $CaF_2$.

FIG. 5 is a drawing showing glass transition temperatures of glasses manufactured according to Experimental Examples in accordance with a function of the molar ratio of $[CaF_2]/([CaF_2]+[CaO])$.

FIG. 6 is a drawing illustrating changes in etching rate by a plasma gas in accordance with the addition and content of $CaF_2$ in the glass composition compared to polycrystalline alumina, single crystal sapphire, and quartz glass.

FIG. 7 is a drawing showing changes in surface roughness before and after $CF_4$ plasma etching of glasses manufactured according to Experimental Examples compared to three reference materials.

FIG. 8A to FIG. 8E are drawings showing Gaussian curve fitting for a structural unit $Q^n$ (800 to 1200 $cm^{-1}$) of Raman spectra.

FIG. 9 is a drawing showing an area fraction of the structural unit $Q^n$ in accordance with a function of the molar ratio of $[CaF_2]/([CaF_2]+[CaO])$ at 800 to 1200 $cm^{-1}$.

FIG. 10 is a drawing showing surface micro-structures and results of component analysis before and after plasma etching.

MODE FOR CARRYING OUT THE INVENTION

Hereinafter, preferred embodiments according to the present invention will be described in detail with reference to the accompanying drawings. However, the following embodiments are provided so that those skilled in the art can fully understand the present invention, and may be modified into various other forms, and the scope of the present invention is not limited to the embodiments to be described below.

In the detailed description or claims of the present invention, when it is said that any one element "includes" another element, it is not construed as being limited to only the element unless otherwise stated, and it should be understood that other elements may be further included.

A plasma-resistant glass according to a preferred embodiment of the present invention includes 32 to 52 mol % of $SiO_2$, 5 to 15 mol % of $Al_2O_3$, 30 to 55 mol % of CaO, and 0.1 to 15 mol % of $CaF_2$ as chemical components.

It is preferable that the CaO and the $CaF_2$ have a molar ratio of 2.5:1 to 50:1.

The glass transition temperature ($T_g$) of the plasma-resistant glass may be lower than 750° C.

The crystallization temperature ($T_c$) of the plasma-resistant glass may be lower than 1090° C.

The glass stability index $K_H$ of the plasma-resistant glass may be expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass may exhibit a $K_H$ in the range of 2.0 to 3.5.

The plasma-resistant glass may be a glass used in a mixed plasma environment of fluorine and argon (Ar), and the plasma-resistant glass may have plasma resistance properties with an etching rate of 10 nm/min or lower for a mixed plasma of fluorine and argon (Ar).

The plasma-resistant glass may further include 0.01 to 15 mol % of $Y_2O_3$ as a chemical component.

The plasma-resistant may further include 0.01 to 15 mol % of $ZrO_2$ as a chemical component.

A method for manufacturing a plasma-resistant glass according to a preferred embodiment of the present invention may include preparing a plasma-resistant glass raw material by mixing $SiO_2$ powder, a $Al_2O_3$ precursor, a CaO precursor, and $CaF_2$ powder, melting the plasma-resistant glass raw material in an oxidizing atmosphere, rapidly cooling the melt, heat-treating the rapidly cooled resultant product at a temperature higher than the glass transition temperature, and annealing the heat-treated resultant product to obtain a plasma-resistant glass, wherein the plasma-resistant glass may include 32 to 52 mol % of $SiO_2$, 5 to 15 mol % of $Al_2O_3$, 30 to 55 mol % of CaO, and 0.1 to 15 mol % of $CaF_2$ as chemical components.

It is preferable that the heat-treatment is performed at a temperature higher than the glass transition temperature ($T_g$) of the plasma-resistant glass and lower than the crystallization temperature ($T_c$) of the plasma-resistant glass.

The $Al_2O_3$ precursor may include $Al(OH)_3$ powder, and the CaO precursor may include $CaCO_3$ powder.

The plasma-resistant glass raw material may further include $Y_2O_3$ powder, and the plasma-resistant glass may further include 0.01 to 15 mol % of $Y_2O_3$ as a chemical component.

The plasma-resistant glass raw material may further include $ZrO_2$ powder, and the plasma-resistant glass may further include 0.01 to 15 mol % of $ZrO_2$ as a chemical component.

It is preferable that the CaO and the $CaF_2$ have a molar ratio of 2.5:1 to 50:1.

The glass transition temperature ($T_g$) of the plasma-resistant glass may be lower than 750° C.

The crystallization temperature ($T_c$) of the plasma-resistant glass may be lower than 1090° C.

The glass stability index $K_H$ of the plasma-resistant glass may be expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass may exhibit a $K_H$ in the range of 2.0 to 3.5.

The plasma-resistant glass may be a glass used in a mixed plasma environment of fluorine and argon (Ar), and the plasma-resistant glass may have plasma resistance properties with an etching rate of 10 nm/min or lower for a mixed plasma of fluorine and argon (Ar).

Hereinafter, the plasma-resistant glass according to a preferred embodiment of the present invention will be described in more detail.

The more the plasma-resistant glass contains an oxide of a high $T_B$ (boiling point) of a metal fluoride, the better the resistance is for plasma etching. In addition, the glass is uniformly etched due to the amorphous structure thereof, so that the occurrence of particle contamination is suppressed. When a $R_2O_3$—$SiO_2$—$Al_2O_3$(R: Gd, La, Y) glass is exposed to plasma, the addition of a rare earth oxide which forms a fluorine compound of a high boiling point on the surface of the glass contributes to a low etching rate. A RO—$Al_2O_3$—$SiO_2$ (R: Mg, Ca, Sr, Ba) glass reacts with $CF_4$ plasma and forms an $RF_2$-based fluorine compound having a high boiling point on the surface. The higher the $T_B$ thereof, the lower the etching rate. As described above, the reaction between a component of the glass composition and a fluorine-based plasma forms a fluorine-based compound layer on the surface, thereby affecting the etching rate.

Based on the above, when $CaF_2$ having a high $T_B$ is applied to a glass, the plasma resistance properties may be improved. In addition, since $CaF_2$ is effective in reducing viscosity and melting point, it is possible to manufacture a low-melting-point glass which is easy to process.

In consideration of the above points, the plasma-resistant glass according to a preferred embodiment of the present invention includes 32 to 52 mol % of $SiO_2$, 5 to 15 mol % of $Al_2O_3$, 30 to 55 mol % of CaO, and 0.1 to 15 mol % of $CaF_2$ as chemical components.

The plasma-resistant glass may further include 0.01 to 15 mol % of $Y_2O_3$ as a chemical component.

The plasma-resistant may further include 0.01 to 15 mol % of $ZrO_2$ as a chemical component.

It is preferable that the CaO and the $CaF_2$ have a molar ratio of 2.5:1 to 50:1.

The glass transition temperature ($T_g$) of the plasma-resistant glass may be lower than 750° C. For example, the glass transition temperature ($T_G$) may be about 680 to 749° C.

The crystallization temperature ($T_c$) of the plasma-resistant glass may be lower than 1090° C. For example, the crystallization temperature ($T_c$) may be about 1030 to 1089° C.

The glass stability index $K_H$ of the plasma-resistant glass may be expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass may exhibit a $K_H$ in the range of 2.0 to 3.5.

The plasma-resistant glass may be a glass used in a mixed plasma environment of fluorine and argon (Ar), and the plasma-resistant glass may have plasma resistance properties with an etching rate of 10 nm/min or lower for a mixed plasma of fluorine and argon (Ar).

Hereinafter, the method for manufacturing a plasma-resistant glass according to a preferred embodiment of the present invention will be described in method more detail.

A plasma-resistant glass raw material is prepared by mixing $SiO_2$ powder, a $Al_2O_3$ precursor, a CaO precursor, and $CaF_2$ powder.

The $Al_2O_3$ precursor is converted into $Al_2O_3$ in a melting process and/or rapid cooling process to be described later. To this end, it is preferable that the melting to be described later is performed in an oxidizing atmosphere such as oxygen ($O_2$) and air. The $Al_2O_3$ precursor may include $Al_2O_3$ powder.

The CaO precursor is converted into CaO in a melting process and/or rapid cooling process to be described later. To this end, it is preferable that the melting to be described later is performed in an oxidizing atmosphere such as oxygen ($O_2$) and air. The CaO precursor may include $CaCO_3$ powder.

It is preferable that the contents of the CaO precursor and the $CaF_2$ powder are controlled such that the CaO and the $CaF_2$ have a molar ratio of 2.5:1 to 50:1 in chemical compositions of a finally produced plasma-resistant glass.

The plasma-resistant glass raw material may further include $Y_2O_3$ powder.

The plasma-resistant glass raw material may further include $ZrO_2$ powder.

The plasma-resistant glass raw material is melted in an oxidizing atmosphere. The plasma-resistant glass raw material is melted by maintaining a temperature at which the plasma-resistant glass raw material may be melted (e.g., a temperature of 1300 to 1800° C.) for a predetermined period of time (e.g., 1 to 48 hours). It is preferable that the melting is performed at a temperature of 1300-1800° C. in an oxidizing atmosphere.

The melt is rapidly cooled. The rapid cooling may be performed by water cooling, air cooling, or the like.

The rapidly cooled resultant product is heat-treated at a temperature higher than the glass transition temperature. It is preferable that the heat-treatment is performed at a temperature (e.g., 760 to 850° C.) higher than the glass transition temperature ($T_g$) of the plasma-resistant glass and lower than the crystallization temperature ($T_c$) of the plasma-resistant glass.

The heat-treated resultant product is annealed to obtain a plasma-resistant glass.

The plasma-resistant glass thus manufactured includes 32 to 52 mol % of $SiO_2$, 5 to 15 mol % of $Al_2O_3$, 30 to 55 mol % of CaO, and 0.1 to 15 mol % of $CaF_2$ as chemical components. The plasma-resistant glass may further include 0.01 to 15 mol % of $Y_2O_3$ as a chemical component. The plasma-resistant glass may further include 0.01 to 15 mol % of $ZrO_2$ as a chemical component. It is preferable that the CaO and the $CaF_2$ have a molar ratio of 2.5:1 to 50:1.

The glass transition temperature ($T_g$) of the plasma-resistant glass may be lower than 750° C. For example, the glass transition temperature ($T_g$) may be 680 to 749° C.

The crystallization temperature ($T_c$) of the plasma-resistant glass may be lower than 1090° C. For example, the crystallization temperature ($T_c$) may be about 1030 to 1089° C.

The glass stability index $K_H$ of the plasma-resistant glass may be expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass may exhibit a $K_H$ in the range of 2.0 to 3.5.

The plasma-resistant glass may be a glass used in a mixed plasma environment of fluorine and argon (Ar), and the plasma-resistant glass may have plasma resistance properties with an etching rate of 10 nm/min or lower for a mixed plasma of fluorine and argon (Ar).

Hereinafter, Experimental Examples according to the present invention will be specifically described, and the present invention is not limited to Experimental Examples described below.

The more the plasma-resistant glass contains an oxide of a high $T_B$ (boiling point) of a metal fluoride, the better the resistance is for plasma etching. In addition, the glass is uniformly etched due to the amorphous structure thereof, so that the occurrence of particle contamination is suppressed. When a $R_2O_3$—$SiO_2$—$Al_2O_3$ (R: Gd, La, Y) glass is exposed to plasma, the addition of a rare earth oxide which forms a fluorine compound of a high boiling point on the surface of the glass contributes to a low etching rate. A RO—$Al_2O_3$—$SiO_2$ (R: Mg, Ca, Sr, Ba) glass reacts with $CF_4$ plasma and forms an $RF_2$-based fluorine compound having a high boiling point on the surface. The higher the $T_B$ thereof, the lower the etching rate. As described above, the reaction between a component of the glass composition and a fluorine-based plasma forms a fluorine-based compound layer on the surface, thereby affecting the etching rate.

Based on the above, when $CaF_2$ having a high $T_B$ is applied to a glass, the plasma resistance properties may be improved. In addition, since $CaF_2$ is effective in reducing viscosity and melting point, it is possible to manufacture a low-melting-point glass which is easy to process.

The present experimental example was to confirm the above prediction. The content of $CaF_2$ was adjusted differently from 0 to 9.6 mol %, and changes in thermal and structural properties of the glass in accordance with the content of $CaF_2$ were confirmed. In addition, after high-density plasma dry etching using a $CF_4/O_2/Ar$ mixed gas, plasma resistance was evaluated in terms of etching rate and in terms of surface roughness and micro-structure analysis.

1. Manufacturing of Glass

The composition of a glass containing a fluoride component was $SiO_2$—$Al_2O_3$-(48-x)CaO-x$CaF_2$ (CASF), and the glass was manufactured by a melt-quenching method.

The $CaF_2$ content was measured by weighing raw materials by adjusting the CaO:$CaF_2$ ratio as shown in Table 1. As plasma-resistant glass raw materials, $SiO_2$ powder, $Al(OH)_3$ powder, $CaCO_3$ powder, and $CaF_2$ powder were used, and the raw materials were weighed such that the composition ratio shown in Table 1 is achieved.

The weighed raw materials were uniformly mixed for 3 hours using a 3D mixer.

Glass melting was performed at 1400° C. for 2 hours by putting the mixed raw materials into a platinum crucible and using a heating electric furnace.

The melt was poured into a graphite mold and then rapidly cooled, and in order to remove internal stress, the melt was annealed after being maintained at a temperature which is 50° C. higher than the glass transition temperature for 2 hours. The glass manufactured according to the experimental example is a CASF glass having a $SiO_2$—$Al_2O_3$-(48-x) CaO-x$CaF_2$ composition.

The crystal phase of the glass thus manufactured was confirmed using an X-ray diffractometer (DMAX-2500, Rigaku, Japan).

TABLE 1

| Glass code | $SiO_2$ | $Al_2O_3$ | CaO | $CaF_2$ | CaO:$CaF_2$ |
|---|---|---|---|---|---|
| G1000 | 42.9 | 9.1 | 48 | — | 10:0 |
| G9505 | 42.9 | 9.1 | 45.6 | 2.4 | 9.5:0.5 |
| G9010 | 42.9 | 9.1 | 43.2 | 4.8 | 9:1 |
| G8515 | 42.9 | 9.1 | 40.8 | 7.2 | 8.5:1.5 |
| G8020 | 42.9 | 9.1 | 38.4 | 9.6 | 8:2 |

In the present experimental example, the effect of substituting CaO of a CaO—$Al_2O_3$—$SiO_2$ (CAS) glass with $CaF_2$ on the structure, thermal properties, and plasma resistance properties of the glass was investigated. As $CaF_2$ was added, the glass transition temperature ($T_g$), crystallization temperature ($T_c$), and liquidus temperature (Ti) were moved to lower temperatures. It is thought to be related to the destruction of the glass structure by $F^-$ ions due to an increase in the ratio of $Q^2$, which is a glass structural unit, and a decrease in the ratio of $Q^1$. In addition, $CaF_2$ increased erosion resistance against the $CF_4/O_2/Ar$ mixed gas. This is presumed to be due to a high boiling point ($T_B$) of $CaF_2$. Unlike the increased surface roughness of a quartz glass and sintered alumina after etching, the micro-structure of a F-containing glass remained unchanged. Therefore, when $CaF_2$ is substituted with CaO of a CAS glass, the low-temperature viscosity and the high-temperature viscosity of the glass are lowered and the plasma resistance thereof is improved. Hereinafter, the above-described contents will be described in more detail.

2. Thermal Structural Properties

The thermal expansion coefficient (α=100 to 300° C.) and the glass transition temperature ($T_g$) of the glass were measured at a temperature elevation rate of 10° C. in a $N_2$-4 wt % $H_2$ mixed gas atmosphere using a dilatometer (DIL 402 C, NETZSCH, Germany). The crystallization temperature ($T_c$) and the liquidus temperature ($T_l$) thereof were measured at a temperature elevation rate of 10° C. in an Ar atmosphere using a differential thermal analyzer (DTA, Labsys evo, France). A Raman spectrometer (inVia, Renishaw, England) was used for the structure of the glass. The spectrum of the silicate structure in the range of 800 to 1200 $cm^{-1}$ was collected using an Ar excitation laser source having a wavelength of 532 nm.

3. High-Density Plasma Dry Etching

For a plasma etching test, a glass specimen processed into a size of 10×10×2 mm was subjected to double-sided mirror polishing, and the specimen was masked with 5 layers of Kapton tape except for a portion to be etched. For the plasma etching test, a polymer etcher (TCP-9400DFM, Lam Research, USA) was used. The gas ratio based on fluorocarbon was designed to form more fluorine radicals by adding oxygen and the detailed conditions are shown in Table 2. The test was performed for 1 hour, and excessive etching was prevented by using a cycle of 5-minute rest after 10-minute etching. In addition, in order to compare the etching rate with that of a reference material, sintered alumina, sapphire, and quartz glasses were also mounted on a wafer and tested.

TABLE 2

| Parameter | Condition |
|---|---|
| RF Power(W) | 600 |
| RF Power(bias)(W) | 200 |
| $CF_4$(sccm) | 30 |
| Ar(sccm) | 5 |
| $O_2$(sccm) | 10 |
| Pressure(mTorr) | 30 |
| Time(min) | 120 |

4. Evaluation of Plasma Resistance

Plasma resistance in terms of etching rate was evaluated using α-step (surfcorder, ET3000, Kosaka laboratory Ltd., Japan). Plasma resistance in terms of particle contamination was evaluated using a surface roughness tester (surftest, SJ-411, Mitutoyo, Japan). In addition, in order to confirm a surface reaction, the micro-structure was confirmed with a scanning electron microscope (SEM) (JEOL, JSM-6701F, Japan), and energy dispersive spectrometry (EDS) (AZtec-One, Oxford Instruments, UK) was used for component analysis.

FIG. 1 is a photograph showing glasses manufactured according to Experimental Examples.

Referring to FIG. 1, the glass was manufactured clear and transparent in appearance, and as the content of a F component was increased, the yellow color was gradually reduced.

FIG. 2 is a drawing showing results of X-ray diffraction (XRD) analysis of glasses manufactured according to Experimental Examples.

Referring to FIG. 2, glasses manufactured according to Experimental Examples exhibited a typical amorphous diffraction patterns and no crystalline phase was observed.

FIG. 3 is a drawing showing thermal expansion coefficients (α) of glasses manufactured according to Experimental Examples in accordance with a function of the molar ratio of $[CaF_2]/([CaF_2]+[CaO])$.

In FIG. 3, the thermal expansion coefficient (α) calculated at an average temperature between 100 to 300° C. is illustrated in an $[CaF_2]/([CaF_2]+[CaO])$ content relationship. α showed a tendency to increase as CaO in the composition was substituted with $CaF_2$. However, there was no systematic change in a according to the fluorine substitution level in the composition.

FIG. 4 is a drawing showing differential thermal analysis (DTA) curves of glasses manufactured according to Experimental Examples in accordance with the content of $CaF_2$.

FIG. 4 shows the DTA profile of the glass according to changes in the composition, and the crystallization temperature ($T_c$) was lowered as CaO was substituted with $CaF_2$. The liquidus temperature (Ti) was lowered from 1283° C. to about 1200° C. as CaO was substituted with $CaF_2$. It was confirmed that $CaF_2$ served as an agent for reducing the melting point and viscosity of the glass.

FIG. 5 is a drawing showing glass transition temperatures of glasses manufactured according to Experimental Examples in accordance with a function of the molar ratio of $[CaF_2]/([CaF_2]+[CaO])$.

Referring to FIG. 5, the glass transition temperature ($T_g$) is illustrated in the $[CaF_2]/([CaF_2]+[CaO])$ content relationship. The regression between the two variables is as high as 97.6%. This indicates that the effect of the F component on the glass transition temperature ($T_g$) is significant. The term glass stability refers to the ability of a glass to resist crystallization during heating, and the glass stability may be evaluated from the correlation between characteristic temperatures such as $T_g$, $T_c$, and $T_l$. Hrub $\hat{\gamma}$ parameter ($K_H$), which is one of glass stability indexes, is shown in Equation 1 below.

$$K_H = \frac{T_c - T_g}{T_l - T_g} \quad \text{[Equation 1]}$$

$T_g$: Glass transition temperature $T_c$: Crystallization temperature $T_l$: Liquidus temperature Since there is an inverse linear relationship between the parameter $K_H$ and a critical cooling rate, the greater the $K_H$, the higher the stability of the glass, which may be used as a measure of the glass forming ability (GFA) of a melt during cooling. The $K_H$ values and specific temperature values for all the glasses are shown in Table 3. As CaO was substituted with $CaF_2$, the stability of the glass increased and reached a maximum value at $CaF_2$=7.2 mol %. However, when the content of $CaF_2$ was 9.6 mol %, the glass forming ability of the $CaF_2$-containing glasses was the lowest at $K_H$=2.18.

TABLE 3

| Glass code | $T_g$(° C.) | $T_c$(° C.) | $T_l$(° C.) | $K_H$(° C.) |
|---|---|---|---|---|
| G1000 | 794 | 1103.7 | 1283.7 | 1.72 |
| G9505 | 748.5 | 1086.3 | 1196.9 | 3.05 |
| G9010 | 724 | 1086.2 | 1199.8 | 3.19 |
| G8515 | 709.8 | 1085.2 | 1200.0 | 3.27 |
| G8020 | 688.4 | 1041 | 1202.7 | 2.18 |

FIG. 6 is a drawing illustrating changes in etching rate by a plasma gas in accordance with the addition and content of $CaF_2$ in the glass composition compared to polycrystalline alumina, single crystal sapphire, and quartz glass. Referring to FIG. 6, the etching rate showed a tendency to decrease as CaO in the composition was substituted with $CaF_2$. That is, it indicates that the plasma resistance increases. Particularly, when the content of $CaF_2$ was increased to 9.6 mol %, the etching rate was the lowest at 5.04±0.14 nm/min, and compared to that the quartz glass, sintered alumina, and sapphire, it was at 4, 11, and 26%, respectively. When the content of $CaF_2$ was 4.8 mol % or greater, the effect of $CaF_2$ content increase on the etching rate was insignificant. FIG. 7 is a drawing showing changes in surface roughness before and after $CF_4$ plasma etching of glasses manufactured according to Experimental Examples compared to three reference materials.

Referring to FIG. 7, after the etching, the surface roughness of the quartz glass and the surface roughness of the sintered alumina were increased by 26.1% and 24.2%, respectively. On the other hand, the sapphire and the CASF glass maintained very low surface roughness values at $R_a$=0.014 m or less even after the etching, which indicates that uniform etching was achieved during the plasma etching.

FIG. 10 is a drawing showing surface micro-structures and results of component analysis before and after plasma etching. In FIG. 10, (a) represents quartz glass, (b) represents sapphire, (c) represents sintered alumina, (d) represents a G1000 glass sample, and (e) represents a G8020 glass sample.

Referring to FIG. 10, changes in surface micro-structure and results of component analysis of the reference materials and the CASF glass before and after the plasma etching can be confirmed. During the etching, the surface of the specimen was subjected to a chemical reaction with the fluorine component, but no fluorine component was detected as a result of the component analysis. It is determined that a secondary product layer composed of fluorine and glass compositions were completely removed by the strong physical etching. In the case of the quartz glass, the uniform surface was sporadically accompanied by circular local erosion with a size of 1 to 10 m after the etching. In the case of the sintered alumina and the sapphire, although they are composed of the same elements, there were differences in the etching pattern according to the crystal structure. It was observed that the alumina, which has a polycrystalline structure, was locally etched strongly enough to cause the structure to be destroyed. The micro-structures of the sapphire and the CASF glass were so uniform and undifferentiated before and after the etching that they could not be identified by the electron microscope.

From FIG. 5, it was confirmed that the $T_g$ for all the glass compositions decreased as the content of $CaF_2$ increased. In a melting process for manufacturing a glass, the glass network structure of a melt of a silicate glass is a major factor in determining the structure and performance of the glass. $Si^{4+}$ and $Al^{3+}$ are network forming cations combined with cross-linking oxygen ions to form a network of the melt. On the other hand, $F^-$ ions generated by $O^{2-}$ and $CaF_2$ doping are network modifier anions which destroy the bond between Si—O and Al—O, thereby inhibiting the network maintenance of the melt. The effect of $F^-$ ions on the glass network can be confirmed by the Gaussian curve fitting (see FIG. 8A to FIG. 8E) and the area fraction ratio (see FIG. 9) for the structural unit $Q^n$ (800 to 1200 $cm^{-1}$) of Raman spectra. The Raman active vibrations and Raman shifts for all the $Q^n$ values are shown in Table 4.

TABLE 4

| Structural unit | $Q^n$ unit | Raman shift($cm^{-1}$) | Vibrational mode |
|---|---|---|---|
| $[SiO_4]^{4-}$ | $Q^0$ | 850 to 880 | Symmertric stretch |
| $[Si_2O_7]^{6-}$ | $Q^1$ | 900 to 920 | Symmertric stretch |
| $[Si_2O_6]^{4-}$ | $Q^2$ | 950 to 980 | Symmertric stretch |
| $[Si_2O_5]^{2-}$ | $Q^3$ | 1050 to 1100 | Symmertric stretch |
| $SiO_2$ | $Q^4$ | 1190, | Asymmertric stretch |

The addition of $CaF_2$ had an effect on the change of the ratio of $Q^1$ and $Q^2$, and had little effect on the change of the ratio of $Q^0$ and $Q^3$. In addition, as the content of $CaF_2$ increased, the ratio of $Q^1$ increased and the ratio of $Q^2$ decreased, so that it was confirmed that non-cross-linking oxygen was increased. The radius of $F^-$ ions and the radius of $O^{2-}$ ions are respectively $1.25\times10^{-7}$ and $1.32\times10^{-7}$ mm, which are very small, so that they act on a Si—O bond and destroy silicon oxide clusters. In addition, since the electronegativity of $F^-$ ions is higher than that of $O^{2-}$ ions, $F^-$ ions may substitute cross-linking or non-cross-linking oxygen and distort the electron environment of Si atoms. This phenomenon reduces the force constant and frequency of vibrations associated with the Si—O bond in a $[SiO_4]^-$ tetrahedron and weakens the Si—O bond. Therefore, $F^-$ ions may act more effectively on the destruction of the silicate network than $O^{2-}$ ions, which is considered to have affected $T_g$. From the DTA results of FIG. 4, it was confirmed that $T_c$ and $T_l$ were moved to lower temperatures with the addition of $CaF_2$. With the addition of $CaF_2$, the silicate network is changed to $[Si_2O_4F]_{(sheet)}$ or $[SiO_2F]$ (chain), which is described by Reaction Equation 1 and Reaction Equation 2.

$$2[SiO_2]_{(3D\ network)}+F^-=[Si_2O_4F]^-_{(sheet)} \quad \text{[Reaction Equation 1]}$$

$$[Si_2O_4F]^-_{(sheet)}+F^-=2[SiO_2F]^-_{(chain)} \quad \text{[Reaction Equation 2]}$$

In addition, in the silicate melt, $CaF_2$ reacts with $Ca^{2+}$ ions and form two $CaF^+$ ions.

$Ca^{2+}+CaF_2 \Leftrightarrow 2CaF^+$

*$CaF^+$ ions formed by the reaction described above are attached to single-bonded oxygen and reduces an attraction interaction between the single-bonded oxygen ($O^-$) and $Ca^{2+}$, and as a result, the high-temperature viscosity of the glass is decreased. Therefore, it is determined that the structural change of the glass due to the damage to the silicate network of $CaF_2$ causes the decrease in the low-temperature viscosity and the high-temperature viscosity of the glass.

Plasma in which $CF_4/O_2/Ar$ mixed gas is used as an etching gas is decomposed and activated by plasma discharge. As a result, highly reactive fluorine radicals and $Ar^+$ ions are generated and respectively induce a chemical reaction and physical collision with an etching material. Due to the reaction between the etching material and the plasma, a reaction product is formed on the surface. In addition, a detachment reaction (etching) occurs from the substrate by physical sputtering. In FIG. 6, the plasma resistance of all the glasses compared using an etching rate was improved in proportion to the content of $CaF_2$. The glass is a compound composed of various elements, and fluorine radicals and an oxide form a fluorine-based compound. In addition, the higher the $T_B$ of the fluorine-based compound, the lower the etching rate. Table 5 shows the $T_B$ of the fluorine-based compound to elements of the reference material and the glass composition.

TABLE 5

| Fluorine compound | Boiling temperature($T_B$, ° C.) |
|---|---|
| $SiF_4$ | −86 |
| $AlF_3$ | 1275 |
| $CaF_2$ | 2533 |

The lower the $T_B$, the higher the etching rate. $SiF_4$ has a $T_B$ as low as −86° C., and thus, vaporizes at the same time as fluoridation progresses, so that there is no fluoridated layer. The absence of the fluoridated layer affects the increase in the etching rate. $AlF_3$ and $CaF_2$ respectively have a $T_B$ of 1275° C. and 2533° C., and thus, are present as stable solids at room temperature, so that a portion which has been fluorinated has very low volatility and is only affected by physical etching through $Ar^+$ ions. As a result, it is determined that the higher the $T_B$ and the more the content of the fluorine-based compound, the lower the etching rate by $CF_4$ plasma. The fluorine-based compound formed on the surface by a reaction with fluorine may be detached from the surface by the physical etching and act as contaminant particles. In FIG. 10, the surfaces of the quartz glass and the sintered alumina were severely eroded after the etching. In the case of the quartz glass, It was expected that there would be no effect of etching by the micro-structure before the etching. However, since the reaction product with fluoride volatilizes very quickly, local etching occurs, and it is presumed that the acceleration of erosion has occurred in a portion where the local etching has occurred. In the case of the alumina, pores and grain boundaries provide a point where erosion may be concentrated, and thus, are thought to induce contaminant particles during the etching process and contribute to structural defects. On the contrary, it is determined that the sapphire of a single-crystal structure and the CASF glass of an amorphous structure may prevent local etching due to interfaces and pores and the difference in etching rates according to a specific direction. The difference in surface shape change before and after the $CF_4$ plasma etching was consistent with the change in surface roughness (see FIG. 7). Therefore, it acts as an important factor in evaluating plasma resistance to maintain a low surface roughness and a uniform micro-structure in terms of reducing contaminant particles. In Experimental Examples, the structural and thermal properties behavior of the $CaO—Al_2O_3—SiO_2$ glass in accordance with the addition of $CaF_2$ were confirmed. In addition, plasma resistance after the high-density plasma dry etching using the $CF_4/O_2/Ar$ mixed gas as an etching gas was evaluated.

$F^-$ ions by the addition of $CaF_2$ intensified the network destruction of the silicate structure and caused a decrease in viscosity. As a result, the thermal expansion coefficient of the glass was increased, and the transition temperature thereof was decreased from 794° C. to 688.4° C. The above results were consistent with the increase in the ratio of the structural unit $Q^1$ in accordance with the increase in the content of $CaF_2$. The glass forming ability was increased in proportion to the increase in the content of $CaF_2$, and was the highest when the $CaF_2$ content was 7.4 mol %.

As the content of fluorine increased, it was possible to lower the etching rate of the glass to 5.04 nm/min by increasing the content of $CaF_2$ whose $T_B$ was 2533° C. The surface roughness and micro-structure of the glass were maintained flat before and after the $CF_4$ plasma etching.

In conclusion, the addition of $CaF_2$ allowed the low-temperature viscosity ($T_g$) and the high-temperature viscosity (Ti) to decrease, and improved the stability of glass formation and plasma resistance.

Although the present invention has been described in detail with reference to preferred embodiments, the present invention is not limited to the above embodiments, and various modifications are possible by those skilled in the art.

[National R&D business that supported this invention]
[Project unique number] S2520985
[Name of Ministry] Small and Medium Business Administration
[Research and Management Specialized Institution] Korea Technology and Information Promotion Agency for SMEs
[Research business name] WC300
[Research project name] Development of plasma corrosion-resistance surface treatment technology for three-dimensional parts of 600 phi or above for semiconductor/display manufacturing equipment and ultra-large-area parts of the 6-th generation or above.
[Contribution rate] 1/1
[Supervision Institution] I-ONES Co., Ltd.
[Research period] 2017 Jun. 1 to 2021 Dec. 31

The invention claimed is:

1. A plasma-resistant glass comprising 32 to 52 mol % of $SiO_2$, 5 to 15 mol % of $Al_2O_3$, 30 to 55 mol % of CaO, and 0.1 to 15 mol % of $CaF_2$ as chemical components, and
- wherein the plasma-resistant glass consists of an amorphous structure, and wherein the CaO and the $CaF_2$ have a molar ratio of 4:1 to 9:1.

2. The plasma-resistant glass of claim 1, wherein the glass transition temperature ($T_g$) of the plasma-resistant glass is lower than 750° C.

3. The plasma-resistant glass of claim 1, wherein the crystallization temperature ($T_c$) of the plasma-resistant glass is lower than 1090° C.

4. The plasma-resistant glass of claim 1, wherein the glass stability index $K_H$ of the plasma-resistant glass is expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass exhibits a $K_H$ in the range of 2.0 to 3.5.

5. The plasma-resistant glass of claim 1, wherein the plasma-resistant glass is a glass used in a mixed plasma environment of fluorine and argon (Ar), and the plasma-resistant glass has plasma resistance properties with an etching rate of 10 nm/min or lower for a mixed plasma of fluorine and argon (Ar).

6. The plasma-resistant glass of claim 1, wherein the plasma-resistant glass further comprises 0.01 to 15 mol % of $Y_2O_3$ as a chemical component.

7. The plasma-resistant glass of claim 1, wherein the plasma-resistant glass further comprises 0.01 to 15 mol % of $ZrO_2$ as a chemical component.

8. A method for manufacturing a plasma-resistant glass, the method comprising:
- preparing a plasma-resistant glass raw material by mixing $SiO_2$ powder, a $Al_2O_3$ precursor, a CaO precursor, and $CaF_2$ powder;
- melting the plasma-resistant glass raw material in an oxidizing atmosphere;
- rapidly cooling the melt;
- heat-treating the rapidly cooled resultant product at a temperature higher than the glass transition temperature; and
- annealing the heat-treated resultant product to obtain a plasma-resistant glass, wherein the plasma-resistant glass includes 32 to 52 mol % of $SiO_2$, 5 to 15 mol % of $Al_2O_3$, 30 to 55 mol % of CaO, and 0.1 to 15 mol % of $CaF_2$ as chemical components, and
- wherein the plasma-resistant glass consists of an amorphous structure, and wherein the CaO and the $CaF_2$ have a molar ratio of 4:1 to 9:1.

9. The method of claim 8, wherein the heat-treatment is performed at a temperature higher than the glass transition temperature ($T_g$) of the plasma-resistant glass and lower than the crystallization temperature ($T_c$) of the plasma-resistant glass.

10. The method of claim 8, wherein the $Al_2O_3$ precursor comprises $Al(OH)_3$ powder, and the CaO precursor comprises $CaCO_3$ powder.

11. The method of claim 8, wherein the preparing step further comprises $Y_2O_3$ powder, and the plasma-resistant glass further comprises 0.01 to 15 mol % of $Y_2O_3$ as a chemical component.

12. The method of claim 8, wherein the preparing step further comprises $ZrO_2$ powder, and the plasma-resistant glass further comprises 0.01 to 15 mol % of $ZrO_2$ as a chemical component.

13. The method of claim 8, wherein the glass transition temperature ($T_g$) of the plasma-resistant glass is lower than 750° C.

14. The method of claim 8, wherein the crystallization temperature ($T_c$) of the plasma-resistant glass is lower than 1090° C.

15. The method of claim 8, wherein the glass stability index $K_H$ of the plasma-resistant glass is expressed by the following formula, $$K_H = \frac{T_c - T_g}{T_l - T_g}$$

(wherein $T_g$ is the glass transition temperature, $T_c$ is the crystallization temperature, and $T_l$ is the liquidus temperature), and the plasma-resistant glass exhibits a $K_H$ in the range of 2.0 to 3.5.

16. The method of claim 8, wherein the plasma-resistant glass is a glass used in a mixed plasma environment of fluorine and argon (Ar), and the plasma-resistant glass has plasma resistance properties with an etching rate of 10 nm/min or lower for a mixed plasma of fluorine and argon (Ar).

* * * * *